Nov. 7, 1961 K. F. RENTSCHLER 3,007,387
PHOTOGRAPHIC CAMERA HAVING AUTOMATIC EXPOSURE SETTING MEANS
Filed Sept. 14, 1960
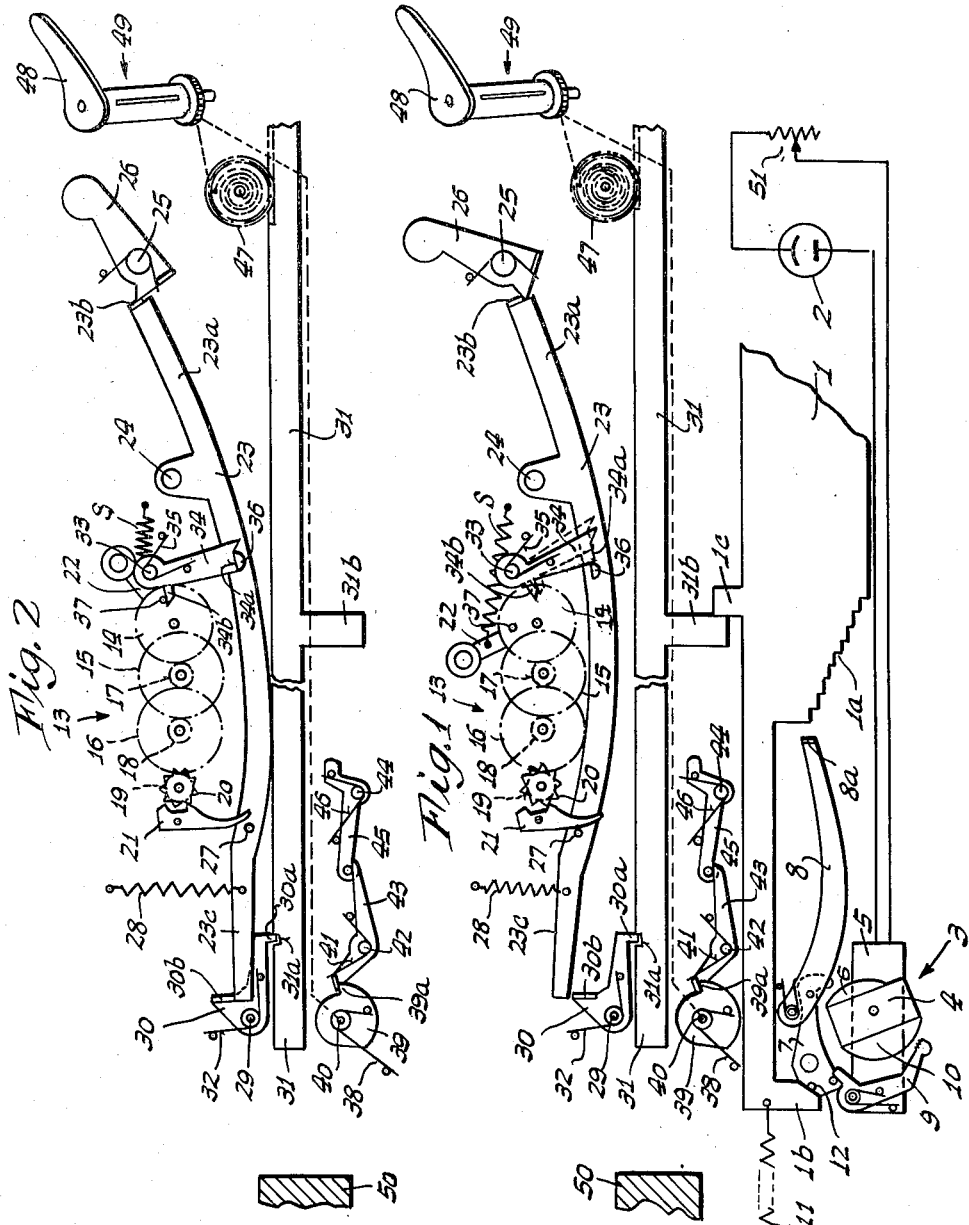
INVENTOR.
Karl F. Rentschler
BY
March, Gillette, Virgil & Eslinger
ATTORNEYS

3,007,387
PHOTOGRAPHIC CAMERA HAVING AUTOMATIC EXPOSURE SETTING MEANS

Karl F. Rentschler, deceased, late of Calmbach (Enz), Germany, by Waldemar T. Rentschler, executor, Calmbach (Enz), Germany, assignor to Alfred Gauthier, G.m.b.H., Calmbach (Enz), Germany, a corporation of Germany
Filed Sept. 14, 1960, Ser. No. 56,058
Claims priority, application Germany Sept. 16, 1959
1 Claim. (Cl. 95—53)

This invention relates to photographic cameras of the type which are provided with automatic exposure setting devices.

Various kinds of photographic cameras of the above type are well known in the art. These cameras offer and have the special, particular advantage that the exposure setting may be effected with a maximum degree of accuracy as well as with speed and simplicity, while making the proper allowance for the prevailing light conditions.

An object of the present invention is to provide a novel and improved photographic camera of the type equipped with an automatic exposure setting means, wherein the above listed inherent advantages may still be had even when a delayed action device is incorporated in the camera.

This object is accomplished, in accordance with the invention, by the provision in the camera construction of a selectively connectable or operable delayed action device which is arranged to be released in response to actuation of the camera release, said delayed action device after having run down releasing a locking device whose function is to retain in cocked condition a control member which influences the exposure setting member and also the shutter release of the camera. The organization as provided by the invention further comprises an intermediary member which is arranged to be actuated by the camera release and which operates to release the said locking device when the delayed action device is not utilized or placed in its operative condition.

A camera as thus provided in accordance with the invention has the important advantage that for exposures both with and without the use of the delayed action device, automatic adjustment of the exposure factors is effected only immediately prior to the actual release and opening of the camera shutter. This means that only the light intensity which prevails immediately prior to the release of the camera shutter is associated with and utilized to effect the adjustment of the exposure setting member. In consequence, changes in light conditions which may possibly occur while the delayed action device is running down are always fully taken into consideration.

An embodiment of the invention is illustrated in the accompanying drawings in which:

FIG. 1 is a diagrammatic representation of a camera mechanism as provided in accordance with the invention, said mechanism being shown in cocked condition, ready for release.

FIG. 2 is a similar diagrammatic representation showing only the upper portion of FIGURE 1. In FIG. 2 the camera release has been actuated and the delayed action device has run down almost completely but not to the extent where the camera shutter has been released.

As shown in FIG. 1, the exposure setting member of the camera mechanism is indicated by the numeral 1, said setting member comprising for example an exposure time setting member, or a diaphragm setting member, or else an exposure-value setting member. For effecting the various adjusted positions of the exposure setting member 1 there is provided a well-known galvanometer 3 which is energized by current from a photo-electric cell 2, through a circuit in which a balancing or equalizing resistor 51 is arranged. The moving coil 4 of the galvanometer 3 is positioned on a carried member 5, and has a cam 6 engageable by a pivotally mounted sensing member 7, by which the latter senses various adjusted positions of the movable coil 4, as effected by existing light conditions.

For the purpose of translating the various adjusted positions of the movable coil 4, as communicated to the sensing lever 7, into adjusted positions of the setting member 1, there is provided a second pivotal lever 8 which is operably connected in the manner shown in FIG. 1, to the lever 7. One end 8a of the lever 8 is adapted to cooperate with a stepped abutment edge 1a provided on the setting member 1.

For the purpose of holding the movable coil 4 in any of its respective adjusted positions during the sensing operation, the sensing lever 7 is further tensionally connected to a pivotally mounted detent lever 9, which cooperates with a brake surface 10 provided on the movable coil 4. The movements of the two levers 7 and 9 are so correlated that the sensing lever 7 engages the movable coil 4 after engagement has first been effected between the detent lever 9 and the braking member 10.

As seen in FIG. 1, the setting member 1 is disposed in a starting or stressed position which is characterized by a stressed or stretched state of a driving spring 11 which influences the said setting member. In order to insure, for such position of the setting member 1, free and unrestrained movement of the coil 4 of the galvanometer 3 to enable such coil to respond by adjusting movement to the prevailing light intensity, the two levers 7 and 9 are disengaged from the cam 6 and braking member 10 respectively. This is effected by the provision of a member or lug 1b provided on the setting member 1 and cooperating with a pin 12 mounted on the sensing lever 7 whereby engagement of the lug 1b with the pin 12 will effect opposite pivotal movement of the levers 7 and 9 into the positions shown in FIG. 1 prior to the ultimate attainment by the setting member 1 of its fully stressed or cocked position.

During the adjustment operation, the setting member 1 moves from right to left under the action of the driving spring 11, whereby after a short initial movement of the member, the lug 1b becomes disengaged from the pin 12 whereupon the detent lever 9 retains the moving coil 4 in its adjusted position and the sensing lever 7 engages a portion of the cam 6 and is adjustably positioned thereby, such positioning being a function of the prevailing light intensity. The adjustment of the sensing lever 7 in turn effects an adjustable positioning of the blocking lever 8, such positioning also being a function of the light intensity. Further right-to-left movement of the exposure setting member 1 will now bring one of the steps of the stepped edge 1a in engagement with the lug portion 8a of the blocking lever 8. Accordingly, the exposure setting member will be halted in its movement, in a position which also corresponds to the prevailing light intensity, thereby effecting an adjustment of the necessary factors of the camera in keeping with the light conditions. The lower step on the edge 1a (that disposed furthest to the right) corresponds to the maximal value of the light intensity which is being indicated by the light intensity measuring device, and the highest step on the edge 1a corresponds to the minimum value of such light intensity.

The structure of the above-described light intensity measuring device and the stop which is controllable by the same corresponds in general to that disclosed in Austrian Patent No. 202,861. The exposure setting ring 3 which is mentioned in the said patent is equivalent to the setting member 1 of the present application.

In accordance with the present invention it is possible to obtain an advantageous and desirable automatic exposure setting for photographs, both with and without the use of a delayed action device, and this is accomplished by the provision of a delayed action mechanism or device which can be selectively connected or made operative at the will of the operator, said delayed action device being released in response to operation of the camera release and when it is run down, releasing a locking or arresting device which serves to retain in a cocked position a control member provided for controlling the movement of the exposure setting member 1 and also provided for the purpose of actuating the shutter release, all as will be shortly described. The organization as provided by the invention further embraces the provision of an intermediary member which is actuated in response to operation of the camera release and which intermediary member actuates the locking or arresting device when the delayed action device is not being utilized in effecting exposures.

The delayed action device is indicated generally by the numeral 13 in the figures. This device is constructed in a well-known manner, and comprises gears 14, 15 and 16 together with pinions 17, 18 and 19. Connected to the last-named pinion 19 is an anchor or star wheel 20, with which an anchor 21 is operatively associated. In order to cock or set the delayed action device 13 against the action of a driving spring S a cocking lever 22 is provided on the gear 14. The delayed action device 13 is retained in its cocked position by means of a releasable mechanism which includes the anchor lever 21 together with a pin 27 which is fixedly carried by a lever 23 constituting the said intermediary member mentioned above. As seen in FIG. 1, the pin 27 holds the escapement lever 21 against movement when the intermediary member 23 is in a set position which it has attained by clockwise movement from an initial releasing position shown in FIG. 2. The escapement lever 21 when so held prevents turning of the star wheel 20 and pinion 19, whereupon the entire gear train making up the delayed action device is retained in the cocked position as shown in FIG. 1.

The intermediary lever 23 is pivotally movable about a fixed axis 24. It comprises a short arm 23a having at its end a lug 23b provided with an inclined or slanting surface whereby such lug may have a camming action. The lug 23b is engaged, for the position of the lever 23 shown in FIG. 1, by a lever 26 which is pivotally mounted about a fixed axis 25 and which is either connected to the camera release or else constitutes the camera release itself.

The intermediary lever 23 has a long arm 23c which carries the above-mentioned pin 27 included in the releasable mechanism for the delayed action device, such pin as indicated in FIG. 1 locking the escapement lever 21 against movement to retain the delayed action device in its cocked condition. In addition, the arm 23c of the intermediary lever 23 cooperates with an arresting lever 30 which is pivotally mounted about a stationary axis 29 and which functions to retain a control member 31 (to be described below) provided for holding the exposure setting member 1 in a cocked or stressed position, such position being illustrated in FIG. 1. The arresting lever 30 is biased in a clockwise direction by a spring 32 and has a projection 30a which is received in a recess 31a provided in the control member 31.

Upon actuation of the camera release 26, the intermediary lever 23 will be pivoted in a counterclockwise direction against the action of a biasing spring 28 connected with such lever. This causes the arm 23c of the lever 23 to slide over an inclined surface on the lug 30b of the arresting lever 30 and to thereafter snap off such surface and engage the lower edge of the lug, as shown in FIG. 2, so as to bring the intermediary lever 23 into an operable relationship with the arresting lever 30. At the same time, the pin 27 is disengaged from the arresting or escapement lever 21 whereby the delayed action device 13 is released for running down movement, presuming that such device has first been cocked by shifting the cocking lever 22 from the rightmost position shown in FIG. 2 to the leftmost position shown in FIG. 1. In addition, during the counterclockwise movement of the intermediary lever 23 as effected by the camera release 26 a supporting lever 34 pivotally movable about a fixed axis 33 is shifted clockwise under the action of a biasing spring 35 from an inoperative position as shown in FIG. 1 to an operative position as illustrated in FIG. 2. In such operative position, the lever 34 abuts, by means of its end face 34a, a semi-circular pin 36 which is fixedly attached to the intermediary member 23, and such engagement causes the intermediary lever 23 to be held in its shifted position as shown in FIG. 2 and as effected by operation of the camera release 26 even after such release may be disengaged from the lever 23.

The retention of the intermediary lever 23 in the position shown in FIG. 2 as effected by the supporting lever 34, is terminated in response to operation of the delayed action device 13, such termination occurring at the end of the running down movement of the delayed action device. For this purpose, the gear 14 of the delayed action device is provided with a pin 37 arranged to engage a projection 34b provided on the lever 34. When the pin 37 engages the projection 34b as illustrated in FIG. 2, the supporting lever 34 is operatively connected with the delayed action device, for releasing movement thereby against the action of the biasing spring 35. Continued clockwise turning of the gear 14 will now cause the pin 37 to effect a counter-clockwise shifting movement of the lever 34 whereupon it will be disengaged from the pin 36 of the intermediary lever 23. Upon such disengagement occurring the intermediary lever 23 will be shifted clockwise under the action of its spring 28, and will be returned to the starting position shown in FIG. 1 whereby the arm 23c of the lever will effect a counterclockwise movement of the arresting lever 30, thereby to release the locking mechanism which holds the control member 31 in its cocked position.

The initial counterclockwise turning movement of the intermediary lever 23 is termed herein a "first movement" of such lever, and the return movement of the intermediary lever 23 as effected by the return spring 28 is termed herein a "second movement" of the intermediary member. Thus, such intermediary member is considered as having two different movements, the first being counterclockwise and manually effected in response to operation of the camera release 26 and the second being clockwise and automatically effected under power provided by the return spring 28.

When the delayed action device 13 is not to be used, it is allowed to remain in its run-down condition. If the delayed action device is needed, however, to take part in the exposure then the operator arranges for such action merely by cocking the said device. For the run-down condition of the delayed action device 13, the supporting lever 34 occupies an inoperative position which is indicated by the broken outline in FIG. 1, such position being effected by virtue of engagement of the pin 37 carried by the gear 14, with the lug 34b provided on the lever 34. For such position of the lever 34 it is prevented from becoming operative when the camera release 26 is operated to cause counterclockwise movement of the intermediary member 23. Accordingly, after operation of the camera release and counterclockwise shifting of the intermediary member 23 to the positions of such lever and release shown in FIG. 2 the removal of influence from the intermediary member 23 as illustrated now enables the return spring 28 to immediately return or shift clockwise the intermediary member 23, and this will be accompanied by a counterclockwise releasing movement of the arresting lever 30 whereupon the control member 31 will be immediately released following operation of the camera release 26. Thus, the shutter will be immediately released in response to engagement of the lug 31b with the shutter release lever 45, this operation being explained in greater detail at a later point. This mode of operation thus makes it possible to carry out automatically set exposures both with and without the use of the delayed action device, all in an uncomplicated, dependable and economical manner.

The control member 31 serves, as already mentioned above, to control the exposure setting member 1, as well as to release the shutter operating drive. The shutter drive comprises a driving disk 39 which is powered by a driving spring 38, the disk 39 being turnable about an axis 40. In order to retain the driving disk 39 in its cocked position, an arresting lever 43 is provided, turnable about a fixed axis 42. The lever 43 engages, under the action of a biasing spring 41, a projection 39a provided on the driving disk 39. To establish a connection with the control member 31, another lever 45 is provided, positioned about a fixed axis 44. One arm of the lever 45 engages, under the action of a biasing spring 46, the arresting lever 43 whereas the other arm is located in the path of movement of an arm or lug 31b of the control member 31.

The control member 31 is powered by a known driving device or mechanism 47. The driving mechanism 47 is cocked, as illustrated in the drawings, by means of a film transport device 49 of the camera, which device embraces an actuating lever 48. The film transport device 49 serves, in addition to cocking the driving mechanism 47 to also cock in a well-known manner the driving disk 39 of the shutter. The operative connections between the devices 39, 47 and 49 are indicated diagrammatically by broken lines in the figures.

A detailed showing and description of such operative connections has been dispensed with in the present application for reasons of clarity of illustration and brevity, since connections of this type are well known per se. For the same reasons, the drawings do not show the shutter drive which is connected to the driving disk 39. The disk 39 may serve, for example, in a well-known manner to operate an intra-lens shutter. In such case, the connection between the driving disk 39 and the shutter blades would be established through a shutter driving ring positioned concentrically with respect to the shutter axis, as is well known in the art. A connecting link pivotally joined to the driving disk 39 effects oscillation or reverse movement of the shutter driving ring to cause reciprocation of the shutter blades, such organization also being well known in the camera field.

Upon setting or cocking the driving device 47, the control member 31 is shifted from one of its end positions (the leftmost position when viewing the figures) wherein it engages a fixed stop 50, to the right into the cocking or stressed position shown in the figures, wherein it is retained by means of the described releasable locking mechanism 30, 31a. During such cocking movement of the control member 31 the arm or lug 31b thereof is brought into engagement with the arm 1c provided on the exposure setting member 1 whereupon the latter is driven ahead of and concurrently with the member 31 and also brought into its set or cocked position, as shown in FIG. 1. The arm 31b thus serves to retain the exposure setting member 1 in the said cocked position.

In order to insure complete adjustment of the automatic exposure setting member 1 prior to opening of the camera shutter, the spring 11 provided for the member 1 is so related to the power of the drive mechanism 47 and so mutually adjusted that an advance of the control member 31, while it is running down, with respect to the exposure setting member 1 is avoided. That is, the lugs or arms 1c and 31b remain in engagement at all times until the exposure setting member 1 is halted in its properly adjusted position by virtue of abutment of the stop lever 8 with the stepped edge 1a. The organization is such that the extent of movement of the control member from its cocked position until the arm 31b engages the shutter release lever 45 is at least as great as the maximum adjusting movement required of the exposure setting member 1, to take care of extreme light conditions.

The above described construction and organization of driving devices, as provided by the invention, insures a proper operation of the camera wherein at the moment that the shutter commences to open, the setting member 1 has been completely adjusted as determined by the prevailing light intensity, such adjustment being completed at least at the moment at which the shutter driving disk 39 is released. This operation is had, as stated above in detail, both for exposures wherein the delayed action device is to be employed and exposures wherein use of the delayed action device is dispensed with. Thus, there is assurance that the exposure is always in accordance with fully automatic settings, without involving any uncertainty on the part of the operator as to whether or not the conditions of light which prevail immediately before the shutter is released, are the conditions which have influenced and controlled the setting of the camera. This therefore means that the exposure has been effected with an automatic setting of optimal accuracy, as regards the light intensity, since the time that elapses between the end of the running down of the exposure setting number 1 and the start of opening of the camera shutter is of the order of milliseconds in magnitude.

For the purpose of obtaining a simple and readily understandable representation in the figures of the drawings, both the exposure setting member 1 and the control member 31 are illustrated as longitudinally displaceable, slide-like structures. But such representation, however, is not to be construed as a restriction concerning the construction of the members in question, since where the invention is to be applied to a specific camera, these members may be constructed in any suitable manner, as for example as rings, disks or segments.

What is claimed is:

In a photographic camera of the type having automatic exposure setting means, in combination, a camera release; a spring biased control member; locking means adapted to releasably hold the control member in a cocked position, a shutter release actuated by said control member when the latter is released from its cocked position, for thereby releasing the shutter in consequence of the operation of the camera release; a spring biased exposure setting member held in cocked position by the cocked control member and released for setting movement in response to release of the control member; a delayed-action device and means for cocking the same; a releasable mechanism for holding the delayed-action device cocked, said mechanism being actuated by the said camera release to release the delayed action device; and means controlled by the delayed-action device and rendered operative only when the latter is in cocked position for releasing the said locking means when the delayed-action device has run down; an intermediary member arranged to be actuated by the camera release and rendered inoperative when the delayed action device is in cocked position for releasing the said locking means where pictures are taken without utilizing the delayed-action device.

References Cited in the file of this patent
UNITED STATES PATENTS
2,887,025     Rentschler _____ May 19, 1959